United States Patent Office 3,540,847
Patented Nov. 17, 1970

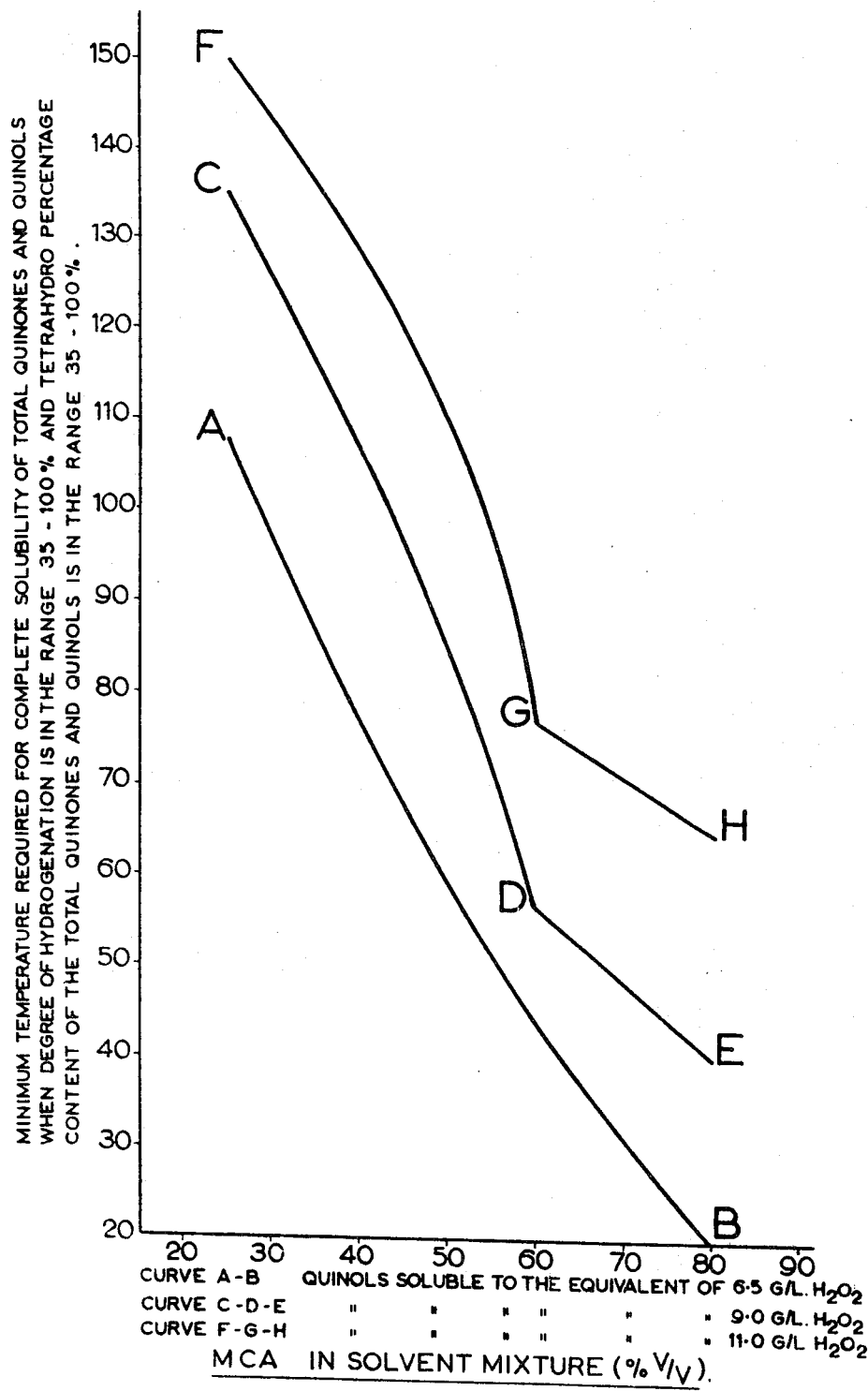

3,540,847
HYDROGEN PEROXIDE
William R. Logan, Dunstable, England, assignor to Laporte Chemicals Limited, Luton, Bedfordshire, England, a British company
Continuation of abandoned application Ser. No. 508,021, Nov. 16, 1965. This application June 11, 1968, Ser. No. 739,898
Claims priority, application Great Britain, Nov. 17, 1964, 46,786/64
Int. Cl. C01b 15/02; C07c 49/68
U.S. Cl. 23—207
11 Claims

ABSTRACT OF THE DISCLOSURE

The cyclic process for the preparation of hydrogen peroxide in which a mixture of anthraquinones and tetrahydroanthraquinone derivatives is alternately hydrogenated and oxidized, may be improved to obtain a working capacity of at least 6.5 grams per liter of hydrogen peroxide, by: (1) the use of at least one aromatic hydrocarbon and a cycloalkanol ester as a solvent (2) by reducing the quinones at least to the extent of 35% (3) by the use of a mixture containing at least 35% of ethyl tetrahydroanthraquinone and (4) by the use of a solvent mixture as specified in (1) above, wherein the proportion of the cycloalkanol ester is between 25 and 80%. The temperature varies between 20 and 150° C.

---

This application is a continuation of Ser. No. 508,021, filed Nov. 16, 1965, now abandoned.

This invention relates to the manufacture of hydrogen peroxide.

As is well-known, hydrogen peroxide can be manufactured by a process which involves the alternate reduction and oxidation of certain organic compounds. In such a process the organic compound may be an anthraquinone or a derivative thereof. Mixtures of anthraquinones and derivatives thereof such as tetrahydroanthraquinones may also be used. Such compounds are dissolved in a solvent system to give a so-called "working solution." Such a solvent system may have one or more components but usually consists of two components. The quinone-containing working solution is firstly subjected to hydrogenation in the presence of a catalyst to form the corresponding quinol and secondly, after separation of the catalyst, subjected to oxidation, normally with air and/or oxygen. Hydrogen peroxide is formed in the oxidation stage and the quinone is regenerated. The hydrogen peroxide is removed, normally by aqueous extraction, and the working solution is re-cycled to the hydrogenation stage.

In such a cyclic process it is clearly desirable to form and extract as much hydrogen peroxide as possible per cycle. However there are many chemical and physical factors which can affect the formation and/or extraction of the hydrogen peroxide. Thus, for example, the quinone or the derivative thereof should have good resistance to degradation during continuous recycling; the solvent system should be such as to maintain both reduced and oxidised forms of the organic compound in solution (thereby avoiding the complication of dealing with a slurry of one or the other); ideally the solvent system should not dissolve in the water (and vice versa) used to extract the hydrogen peroxide; and the partition coefficient of hydrogen peroxide between water and the working solution should be as favourable as possible towards the extraction.

Various working solutions have been proposed for use in such cyclic processes in attempts to raise the output of hydrogen peroxide per cycle, but they suffer from one or more disadvantages which greatly lessen, even outweigh, any increase in output gained. Thus, for example, the use of solvent systems containing trialkyl phosphate esters has been proposed. However these esters are expensive materials; they are somewhat viscous and can give emulsification problems; and they give rise to an unfavourable partition coefficient (vide previous paragraph). In other proposals, working solutions of higher-alkyl substituted anthraquinones in solvents containing a higher-aliphatic alcohol are employed. Such anthraquinones can be highly expensive; their ability to withstand continued hydrogenations and oxidations is uncertain and their nuclearly hydrogenated derivatives are not very soluble in their reduced forms. In addition the alcohol is fairly soluble in water and consequently losses into the extraction water are appreciable.

One known cyclic process operating satisfactorily at present on a commercial scale suffers very little, or not at all, from the various disadvantages referred to in the previous paragraph, viz: that in which the working solution contains 2-ethylanthraquinone in a solvent system comprising a mixture of at least one aromatic hydrocarbon (suitably xylene or a mixture of xylenes and/or other alkyl-substituted benzenes) and at least one cycloalkanol ester (suitably an ester of an alkyl substituted cyclohexanol with a lower monobasic saturated aliphatic acid). As is well-known, during continued use of such a solution an amount of 2-ethyltetrahydroanthraquinone is formed from the parent compound and dissolves in the solvent system and is hydrogenated and oxidised therein in similar manner to the parent compound.

Hitherto, however, the productive capacity of such a process has been much less than those referred to above. However, we have now found that, it is surprisingly possible to increase substantially the productive capacity of such a process and, quite unexpectedly, maintain the process at such increased capacity for extensive periods provided that various parameters are selected in accordance with the present invention.

The invention provides a cyclic process for the manufacture of hydrogen peroxide from a working solution containing 2-ethylanthraquinone and 2-ethyl tetrahydroanthraquinone dissolved in a solvent system comprising a mixture of at least one aromatic hydrocarbon and at least one cycloalkanol ester, in which (a) the degree of hydrogenation is such that at least 35% of the total quinone content of the working solution is converted to the quinol form, (b) at least 35% by weight of the quinones subjected to hydrogenation is 2-ethyltetrahydroanthraquinone, (c) from 25 to 80% v./v. of the solvent mixture consists of at least one cycloalkanol ester and (d) the actual percentage of ester and the temperature of hydrogenation are so chosen in combination that the capacity of the working solution for producing hydrogen peroxide is at least 6.5 g.p.l., preferably at least 9 g.p.l. or 11 g.p.l.

For convenience hereinafter phrases such as "of the total content of the working solution is converted to the quinol form" will be abbreviated to "of the theoretical maximum."

It is preferred to select closely similar values (normally within 10% of each other) for parameters (a) and (b) since we find that this represents conditions in the steady state over prolonged periods of operation of a process in accordance with the invention.

Preferably the ester compound of the solvent system is an alkyl cyclohexanol ester of acetic acid, although it can be of propionic or butyric acids. Preferably, too, the aromatic hydrocarbon component has a boiling point equal to or greater than that of xylene. When operating in accordance with the invention the hydrogenation temperature for a given solvent system is advantageously selected such that the former is appreciably less than the boiling point of the latter.

One preferred ester for use in the solvent system of processes according to the invention is methyl cyclohexanol acetate, hereinafter referred to as "MCA." Commercially available MCA is a mixture of the 2-methyl, 3-methyl and 4-methyl isomers with a small amount of dimethyl isomers. One very suitable hydrocarbon component for the solvent system is the mixture of aromatic hydrocarbons obtained as a petroleum cut having a boiling range commencing about 145° C. to 150° C. and ending at about 210° C. Such a cut is commercially available under the name "Aromasol."

Desirably the ester:hydrocarbon ratio by volume is from 2:3 to 3:2, advantageously 1:1.

We have found that, provided parameters (a) and (b) are selected within the limits defined, variations of (c) (within the limits defined) in combination with variation of the temperature of hydrogenation can often result in processes having 10–15 g.p.l. $H_2O_2$ capacities.

The combination required to achieved the desired result follows a complex pattern but, by way of guidance, the accompanying curves illustrate many of the results which can be achieved in accordance with the invention when employing, for example, solvent mixtures of Aromasol and MCA. The ordinate gives values of minimum temperature of hydrogenation required for complete solubility of total quinones and quinols when the degree of hydrogenation is in the range 35–100% and the tetrahydro content of total quinones and quinols is in the range 35–100%. The abscissa gives v./v. percentage of MCA in the solvent system. The curves show how such minimum temperatures under such conditions vary with v./v. percentage of MCA in the solvent system to give quinol solubilities of the equivalent of 6.5 gms./litre $H_2O_2$ (curve AB), of 9.0 gms./litre $H_2O_2$ (curve CDE) and of 11 gms./litre $H_2O_2$ (curve FGH). Even under the most adverse combination of parameters (a) and (b)—which is normally when the degree of hydrogenation is at a maximum and the tetrahydro content of the total quinones and quinols is at the minimum specified herein i.e. 35%—solubility of quinols equivalents to the levels indicated by each separate curve is achievable by selecting values of minimum temperature and solution composition indicated by such curve. Under more favourable combinations of parameters (a) and (b) lower temperatures than those given by the curves may be employed to give similar results.

Thus, in accordance with a feature of the invention there are provided cyclic processes having the features (a), (b) and (c), in which the value of the latter and of the hydrogenation temperature are so chosen in combination that they can be represented by a point lying on or to the right of curve AB to give a capacity of at least 6.5 g.p.l.

It should however be understood that not all the processes giving a capacity of at least 6.5 g.p.l. fall within the area on or to the right of curve AB. The Table I of Example 4 herein illustrates processes in accordance with the present invention which processes give rise to a capacity of 6.5 g. $H_2O_2$ per liter of working solution yet fall to the left of curve AB in the graph. This illustrates the statement made above to the effect that the results achievable using the data illustrated by the curves is achievable under the worst possible combination of parameters (a) and (b). The effect of choosing more favourable relative values of these parameters is shown in Table I of Example 4 in the ability to achieve given productive levels at temperatures in combination with particular solution compositions lower than would be expected from such curves.

In accordance with a further feature of the invention there are provided cyclic processes having the features (a), (b) and (c), in which the value of the latter and of the temperature of hydrogenation are so chosen in combination that they can be represented by a point lying on or to the right of curve CDE to give a capacity of at least 9 g.p.l.

Again it should be understood that not all the processes giving a capacity of at least 9 g.p.l. fall within the area on or to the right of curve CDE. The Table II of Example 4 illustrates this point in a similar manner to that discussed above in connection with curve AB.

In accordance with a still further feature there are provided cyclic processes having the features (a), (b) and (c), in which the value of the latter and of the temperature of hydrogenation are so chosen in combination that they can be represented by a point lying on or to the right of curve FGH to give a capacity of at least 11 g.p.l. Similar observations obtain to this curve as obtained to the curves AB and CDE discussed above.

A further, a very important, manner by which it is possible to achieve productive capacities of the three stated levels, at hydrogenation temperatures below those which would be expected by reference to the relevant curves, is referred to hereafter just prior to the examples.

It will be understood that in each process in accordance with the invention the working solution must contain a sufficient quantity of quinones to enable the productive capacity to be actually realised. Thus, assuming for the purpose of example the use of ethylanthraquinone alone, one gram-mole (236 g.) will produce 34 g. of $H_2O_2$ (when 100% hydrogenated and the resultant quinol completely oxidised). Hence, in order to yield quinols in solution equivalent to 10 g.p.l. $H_2O_2$ whilst employing a degree of hydrogenation of 50% of the theoretical maximum, one requires $$236 \times \frac{100}{50} \times \frac{10}{34} \text{ g.p.l.}$$

of ethylanthraquinone, i.e. 139 g.p.l.

Nevertheless it is not merely a matter of taking the calculated quantity of quinones. It is essential to ensure that the quinones, and the quinols formed therefrom during hydrogenation, are completely dissolved. Thus, for example, unless these compounds dissolve completely by the completion of the hydrogenation they will coat the catalyst used during the hydrogenation step and gradually render it ineffective. However, provided that parameters are chosen in accordance with the present invention, complete dissolution will be obtained, the aforesaid disadvantage avoided, and the desired productive capacity achieved.

We have found that even employing low degrees of hydrogenation, for example 35%–45% of theoretical maximum, there is surprisingly good solubility of the larger amount of quinones and quinols involved—provided parameters are chosen in accordance with the invention.

We have also found that there are unexpected peaks in the solubility of quinones and quinols at temperatures of 70° C. and above (i) when the degree of hydrogenation is 65% of the theoretical maximum and the $H_4EAQ$ proportion of the quinones subjected to hydrogenation is about 75%, or (ii) when the degree of hydrogenation is at least 65% of the theoretical maximum and the $H_4EAQ$ proportion of the quinones subjected to hydrogenation is about 85%.

Thus in accordance with preferred features, the present invention provides cyclic processes as herein defined (I) wherein the hydrogenation temperature is at least 70° C., the $H_4EAQ$ content is 70% to 80%, preferably 75%, and the degree of hydrogenation is 65% of theoretical; and (II) wherein the hydrogenation temperature is at least 70° C., the $H_4EAQ$ content is 85% and the degree of hydrogenation is greater than 65%, suitably up to 85%. In each case the preferred hydrogenation temperature range is from 70° C. to 150° C., suitably 70° C. to 120° C.

Further advantageous processes in accordance with this invention are those (i) in which the hydrogenation temperature is 70° C. to 90° C., the $H_4EAQ$ content is greater than 60% and the degree of hydrogenation is from 45% to 90%; and (2) in which the degree of hydrogenation is 72% to 73%; from 50%–65% by weight of the quinones subjected to hydrogenation is $H_4EAQ$: the solvent system is 1:1 ester:hydrocarbon and the hydrogenation temperature is 100–110° C., preferably 105° C. The latter process has a productive capacity of 18 to 20 g.p.l. $H_2O_2$.

On occasions it may be found advantageous in accordance with the invention to employ working solutions in which all the quinone content is $H_4EAQ$. This is more likely to be useful at hydrogenation temperature of 70° C. or more. Generally however from 90–95% $H_4EAQ$ is a suitable upper limit.

Continuous working of a cyclic process as herein defined results in the building up of inert material that has no direct value per se in the production of hydrogen peroxide. Such material cannot readily be analysed and hence has become referred to as "unidentified material," although it is known normally to contain degradation products of the solute of the working solution, which products are mainly formed during the hydrogenation stage. However, the $H_4EAQ$ and its hydrogenated derivative are not to be considered as degradation products. The tetrahydro forms have hydrogen peroxide producing capacity. Hence, when employed herein the term "unidentified material" means the solids which are present in the working solution, after a period of continuous recycling, other than the quinones ($EAQ+H_4EAQ$) content and the quinols derived therefrom. The quinone plus quinols content of a sample of the working solution is easily determined, for example, by a polarographic technique. Hence the amount of unidentified material present in the sample can be readily calculated.

We have found, in complete contrast to what would be predicted, that with high hydrogenation temperatures, e.g. 50° C. and above, more especially 60° C. and above, the rate of formation of unidentified material does not rise to any substantial extent above the rate experienced at say 40–50° C. It is possible therefore, to operate continuously at such high hydrogenation temperatures without the need for special extra measures for regenerating unidentified material—the customary regeneration processes designed to reduce severely or to eliminate such unidentified material can be employed.

However, and in accordance with a very important feature of this invention, we find that, at least on certain occasions, the presence of quite high amounts of unidentified material is advantageous to the extent that it then actually tends to increase the solubility of the quinol forms of EAQ and $H_4EAQ$ and hence increases the $H_2O_2$-producing capacity of the working solution. The extent of the effect varies with temperature of hydrogenation, amount of unidentified material, and proportion of $H_4EAQ$ present. In general with hydrogenations up to 55% of the theoretical maximum it is observed that the major benefits from the presence of unidentified material are obtainable at the higher temperatures and lower $H_4EAQ$ content. However above such degrees of hydrogenation it is found that the more advantageous results are obtained with higher $H_4EAQ$ contents. In general it is found advantageous to employ about 20–120 g. of unidentified material per litre of working solution.

Thus, advantageous processes in accordance with this feature of the invention are those in which the solvent mixture is a 2:3 to 3:2 mixture by volume of aromatic hydrocarbons (preferably Aromasol) and methyl cyclohexanol acetate and has present therein from 20 to 110 g.p.l. (desirably 40 to 80, preferably 50 to 65 g.p.l.) of unidentified material as herein defined, and in which the $H_4EAQ$ proportion of the quinones subjected to hydrogenation is from 35% to 85% (suitably 50% to 70% and preferably 65%) and the degree of hydrogenation is at least 65% of the theoretical maximum.

Other advantageous processes in accordance with the invention and involving the use of such unidentified material are those in which the solvent mixture is a 1:1 mixture by volume of Aromasol and MCA and has present therein from 50 to 100 g.p.l. of the unidentified material, and in which the $H_4EAQ$ proportion of the quinones subjected to hydrogenation is 60% to 85%, preferably 65%, and the degree of hydrogenation is from 50% to 85% suitably 65% to 70%.

Advantageously in processes employing such unidentified material the hydrogenation temperature is from 50 to 110° C.; 50° to 90° C., and 50° to 70° C. being especially suitable ranges.

It will be appreciated that as an important alternative to taking the benefit of the presence of the unidentified material as an increase in the productive capacity of a solution it is possible to reduce the hydrogenation temperature and still get the same capacity as when the unidentified material is present (all other conditions remaining equal). Thus, for example, when operating in accordance with this feature of the invention it will be possible to obtain a production of 6.5 g.p.l. or 9 g.p.l. or 11 g.p.l. of $H_2O_2$ with a hydrogenation temperature less than that which would be predicted from the relevant curve shown in the accompanying graph. As a guide, with some 50 g.p.l. of the unidentified material present in the working solution then, with parameters (a), (b) and (c) fixed, the hydrogenation temperature required to produce 6.5 g.p.l. $H_2O_2$ is some 5° C. to 10° C. less than that required in the corresponding system having no unidentified material present.

In all the cyclic processes in accordance with the invention described above the hydrogenation step will be conducted in the presence of a hydrogenation catalyst, advantageously comprising palladium deposited on a carrier such as, for example, aluminium or synthetic aluminosilicate. After hydrogenation the catalyst will be separated as by filtering from the working solution and the latter will then be subjected to oxidation. The oxidation step will be conducted at a temperature which is suitably in the range 40° C. to 60° C. or higher if desired, although may be at any temperature as low as 25° C. Following the oxidation step the hydrogen peroxide will be extracted in known manner.

The examples which follow illustrate various features of the invention. In these examples the hydrogenation step was conducted with a catalyst comprising palladium deposited onto a synthetic aluminosilicate, and the oxidation step was conducted at a temperature in the range 25° C. to 40° C.

EXAMPLE 1

The increased $H_2O_2$-producing capacity of processes in accordance with the invention is illustrated by the following runs, presented in tabular form. In this example, the hydrogenation step in each case was conducted at 50° C. and to an extent of 50% of the theoretical maximum. The solvent was 50:50 v./v. MCA:Aromasol. The final column shows the maximum productive capacity of each process operating under the aforestated common conditions and having the particular $H_4EAQ$ content and unidentified material concentration stated.

| Percent $H_4EAQ$ content of the quinone mixture subjected to hydrogenation | Unidentified material concentration (g./l.) | Total quinones plus quinols solubility at 55° C. | |
|---|---|---|---|
| | | (g./l.) | ≡$H_2O_2$ (g./l.) |
| 35 | 0 | 168 | 11.8 |
| 50 | 0 | 148 | 10.4 |
| 65 | 0 | 132 | 9.3 |
| 35 | 25 | 186 | 13.6 |
| 50 | 25 | 160 | 11.2 |
| 65 | 25 | 152 | 10.7 |
| 35 | 50 | 197 | 13.5 |
| 50 | 50 | 165 | 11.6 |
| 65 | 50 | 152 | 10.7 |

EXAMPLE 2

The following two tables illustrate the results obtained by varying parameters. N.B. the results at 30° C. and with the 70/30 v./v. systems are added for comparative purposes, as are also the individual runs marked (x).

working solution contained 45 g.p.l. of the unidentified material—except in the last four results in which 75

TABLE I.—EXAMPLE 2

| Temperature of hydrogenation (° C.) | Percent $H_4EAQ$ in the mixture of quinones subjected to hydrogenation | Hydrogenation percent of theoretical maximum | Total quinones plus quinols solubility (g./l. solution) | Solubility, $\equiv H_2O_2$, g./l. |
|---|---|---|---|---|
| 30 [1] | 59 | 62 | 49 | 4.3 |
|  | 64 | 80 | 47 | 5.3 |
|  | 86 | 63 | 56 | 5.0 |
| 50 [1] | 56 | 57 | 73 | 5.8(x) |
|  | 69 | 66 | 79 | 7.3 |
|  | 82 | 81 | 51 | 5.8(x) |
|  | 87 | 91 | 53 | 6.8 |
| 70 [1] | 66 | 65 | 113 | 10.3 |
|  | 55 | 65 | 73 | 6.7 |
|  | 86 | 68 | 110 | 10.5 |
|  | 87 | 87 | 88 | 10.8 |
| 90 [1] | 66 | 64 | 163 | 14.7 |
|  | 67 | 80 | 103 | 11.6 |
|  | 77 | 69 | 185 | 18.0 |
|  | 86 | 90 | 129 | 16.3 |
| 30 [2] | 56 | 57 | 27 | 4.2 |
|  | 79 | 85 | 19 | 2.3 |
| 50 [2] | 59 | 69 | 34 | 3.3 |
|  | 78 | 78 | 27 | 4.9 |
| 70 [2] | 97 | 52 | 83 | 6.1 |

[1] 50/50 v./v. Aromasol/MCA.
[2] 70/30 v./v. Aromasol/MCA.

In Table I, column 4 shows the maximum solubility of quinones plus quinols under the particular conditions indicated in columns 1 to 3 and with the solvent system indicated. Column 5 expresses the solubility figures of column 4 as the corresponding $H_2O_2$ productive capacity.

g.p.l. were present. Again an Aromasol/MCA solvent mixture was employed.

Column 4 shows the maximum solubility of quinones and quinols under the common conditions aforestated and the particular conditions shown in columns 1 to 3.

TABLE II.—EXAMPLE 2
[U.M.="Unidentified material"]

| Temperature of hydrogenation (° C.) | Percent $H_4EAQ$ in the mixture of quinones subjected to hydrogenation | Hydrogenation percent of theoretical | U.M. concn. (g./l. solution) | Total quinones plus quinols solubility (g./l.) | Solubility, $\equiv (H_2O_2$ g./l.) |
|---|---|---|---|---|---|
| 50 [1] | 59 | 51 | 63 | 134 | 9.6 |
|  | 63 | 75 | 58 | 80 | 8.4 |
|  | 68 | 85 | 51 | 72 | 8.6 |
|  | 63 | 67 | 109 | 87 | 8.2 |
|  | 64 | 56 | 107 | 105 | 8.3 |
| 70 [1] | 77 | 76 | 64 | 104 | 11.1 |
|  | 82 | 65.5 | 57 | 125 | 11.5 |

[1] 50/50 Aromasol/MCA solvent system.

In Table II, columns 5 and 6 are to be read in the same way as columns 4, 5 of Table I.

Column 5 expresses that solubility in terms of $H_2O_2$-producing capacity.

| MCA in solvent, v./v. | Percent $H_4EAQ$ content in quinone mixture subjected to hydrogenation | Temperature of hydrogenation, ° C. | Total quinones plus quinols, solubility | |
|---|---|---|---|---|
|  |  |  | g./l. | $\equiv H_2O_2$ (g./l.) |
| 40 | 50 | 28 | 60 | 4.49(x) |
|  |  | 45 | 90 | 6.44(x) |
|  |  | 50 | 116 | 8.30 |
|  | 60 | 28 | 56 | 4.00(x) |
|  |  | 50 | 104 | 7.44 |
| 50 | 65 | 28 | 74 | 5.29(x) |
|  |  | 45 | 112 | 8.01 |
|  |  | 50 | 134 | 9.57 |
|  | 75 | 28 | 70 | 5.00(x) |
|  |  | 45 | 110 | 7.87 |
|  |  | 50 | 134 | 9.57 |
| 60 | 50 | 45 | 124 | 8.86 |
|  |  | 50 | 140 | 10.00 |
|  | 65 | 45 | 114 | 8.15 |
|  |  | 50 | 130 | 9.30 |

EXAMPLE 3

The following table illustrates results obtained in cyclic $H_2O_2$-producing process when the degree of hydrogenation was 50% of the theoretical maximum and the N.B. Those runs marked (x) are added for comparative purposes and are not within the scope of the invention.

EXAMPLE 4

The following tables show further examples of processes falling within the scope of the invention. Table I exemplifies processes requiring lower hydrogenation temperatures (for enabling a productive capacity of 6.5 g. $H_2O_2$ per litre of working solution to be obtained) than would be predicted by reference to curve AB. Column 4 shows the actual hydrogenation temperature required; column 5 the predicted temperature; and column 6 the actual productive capacity possible at the latter temperature.

Table II exemplifies processes requiring lower hydrogenation temperatures (for enabling a productive capacity of 9 g. $H_2O_2$ per litre of working solution to be obtained) than would be predicted by reference to curve CDE. Column 4 shows the actual hydrogenation temperature required; and column 5 the predicted temperature.

and at least one cycloalkanol ester and recovering the hydrogen peroxide formed in each oxidation step, the improvement which comprises in combination:
(a) conducting the hydrogenation to the extent of at least 65% of the theoretical maximum;
(b) subjecting to hydrogenation, a mixture of quinones wherein at least 50% is 2-ethyltetrahydroanthraquinone;
(c) conducting the hydrogenation and oxidation in a solvent mixture wherein between 40% and 80% v./v. consists of at least one cycloalkanol ester; and
(d) the hydrogenation temperature is in the range of from 50° C. to 150° C., whereby the production capacity of hydrogen peroxide is at least 6.5 g./l.

2. The improvement according to claim 1 wherein the

TABLE I.—EXAMPLE 4

| MCA (percent) | (Percent) H₄EAQ in quinone subjected to hydrogenation | Degree of hydrogenation (percent) | Actual minimum hydrogenation temperature giving solubility of quinones plus quinols equivalent to 6.5 g./l. H₂O₂ (° C.) | Hydrogenation temperature determined from curve AB to give solubility equivalent to 6.5 g./l. H₂O₂ (° C.) | Actual solubility at temperature in Col. 5 g./l. =H₂O₂. |
|---|---|---|---|---|---|
| 40 | 65 | 100 | 68 | 77 | 7.2 |
|  |  | 85 | 67 | 77 | 7.2 |
|  |  | 65 | 60 | 77 | 8.2 |
|  |  | 50 | 54 | 77 | 10.0 |
|  | 85 | 100 | 62 | 77 | 8.8 |
|  |  | 85 | 64.5 | 77 | 8.25 |
|  |  | 65 | 60 | 77 | 8.55 |
|  |  | 50 | 56 | 77 | 10.0 |
|  | 100 | 100 | 68 | 77 | 7.6 |
|  |  | 85 | 72.5 | 77 | 6.6 |
|  |  | 65 | 71 | 77 | 7.2 |
|  |  | 50 | 51.5 | 77 | 19.4 |
|  |  | 35 | 59 | 77 | 9.7 |
|  | 35 | 50 | 44 | 77 | 15.0 |
| 50 | 65 | 100 | 40 | 59.5 | 7.8 |
|  |  | 85 | 45.5 | 59.5 | 7.5 |
|  |  | 65 | 44.5 | 59.5 | 8.6 |
|  |  | 50 | 39.5 | 59.5 | 10.5 |
|  | 85 | 100 | 46.0 | 59.5 | 8.4 |
|  |  | 85 | 49.0 | 59.5 | 8.3 |
|  |  | 65 | 49.0 | 59.5 | 8.2 |
|  |  | 50 | 40.5 | 59.5 | 10.6 |
|  | 100 | 100 | 54.5 | 59.5 | 7.6 |
|  |  | 85 | 58.5 | 59.5 | 7.1 |
|  |  | 65 | 52.5 | 59.5 | 7.8 |
|  |  | 50 | 42.0 | 59.5 | 11.0 |
|  |  | 35 | 48.0 | 59.5 | 8.95 |
|  | 35 | 50 | 33.5 | 59.5 | 14.1 |
| 60 | 65 | 100 | 30 | 44.5 | 8.8 |
|  |  | 85 | 30 | 44.5 | 7.6 |
|  |  | 65 | 35 | 44.5 | 8.0 |
|  |  | 50 | 33 | 44.5 | 9.4 |
|  | 85 | 100 | 30 | 44.5 | 7.3 |
|  |  | 85 | 37 | 44.5 | 7.4 |
|  |  | 65 | 36 | 44.5 | 8.0 |
|  |  | 50 | 33 | 44.5 | 9.8 |
|  | 100 | 100 | 41 | 44.5 | 7.0 |
|  |  | 85 | 43.5 | 44.5 | 6.8 |
|  |  | 65 | 37.5 | 44.5 | 7.2 |
|  |  | 50 | 33 | 44.5 | 9.8 |
|  |  | 35 | 41.5 | 44.5 | 7.1 |
|  | 35 | 50 | 24.5 | 44.5 | 12.0 |

TABLE II.—EXAMPLE 4

| MCA (percent) | (Percent) H₄EAQ in quinone subjecting to hydrogenation | Degree of hydrogenation (percent) | Actual minimum hydrogenation temperature giving solubility of quinones plus quinols equivalent to 9.0 g./l. H₂O₂ (° C.) | Hydrogenation temperature determined from curve CDE to give solubility equivalent to 9.0 g./l. H₂O₂ (° C.) |
|---|---|---|---|---|
| 40 | 65 | 60 | 74 | 106 |
|  | 85 | 85 | 81 | 106 |
| 50 | 65 | 85 | 73 | 85 |
|  | 65-100 | 50 | 52 | 85 |
| 60 | 85 | 100 | 55 | 57 |
|  |  | 50 | 41 | 57 |

I claim:

1. In a cyclic process for the production of hydrogen peroxide which comprises alternately hydrogenating and oxidizing a working solution containing 2-ethylanthraquinone and 2-ethyltetrahydroanthraquinone dissolved in a solvent comprising at least one aromatic hydrocarbon working solution contains from 20 to 120 g.p.l. of solids other than quinone and quinol compounds, formed from 2-ethylanthraquinone and 2-ethyltetrahydroanthraquinone during continuous recycling of the working solution.

3. The improvement according to claim 1 wherein the hydrogenation temperature is from 70° C. to 150° C.

4. The improvement according to claim 1 wherein the cycloalkanol ester is methyl cyclohexanol acetate.

5. The improvement according to claim 2 wherein the amount of solids is from 50 to 100 g.p.l.

6. The improvement according to claim 1 wherein the solvent system contains a mixture of aromatic hydrocarbons consisting of a petroleum cut having a boiling range of from approximately 145° C. to approximately 210° C.

7. The improvement according to claim 1 wherein the temperature of hydrogenation and the proportion by weight of said cycloalkanol ester are so chosen in combination that, with reference to accompanying drawing: wherein the v./v. percent of the cycloalkanol acetate ester is plotted on the abscissa and the minimum temperature of hydrogenation required for complete solubility of the total quinones and quinols when the degree of hydrogenation is between 65% and 100% and the proportion of said tetrahydroquinone is between 50% and 100%, is plotted on the ordinate, they are represented by a point lying on or to the right of the curve AB in the graph.

8. The improvement according to claim 7, wherein the values of (c) and the temperature of hydrogenation are so chosen in combination that with reference to said graph, they are represented by a point lying on or to the right of curve CDE.

9. The improvement according to claim 7, wherein the values of (c) and the temperature of hydrogenation are so chosen in combination that with reference to said graph, they are represented by a point lying on or to the right of curve FGH.

10. The improvement according to claim 7, in which the values of (a) and (b) are respectively 65% of the theoretical maximum and 70%–80% of the tetrahydro compound.

11. In a cyclic process for the production of hydrogen peroxide which comprises alternately hydrogenating and oxidizing a working solution containing 2-ethylanthraquinone and 2-ethyltetrahydroanthraquinone dissolved in a solvent comprising at least one aromatic hydrocarbon and at least one cycloalkanol ester and recovering the hydrogen peroxide formed in each oxidation step wherein said working solution also contains from 20 to 120 g.p.l. of solids other than quinone and quinol compounds, formed from 2-ethylanthraquinone and 2-ethyltetrahydroanthraquinone during continuous recycling of the working solution, the improvement which comprises in combination:
   (a) conducting the hydrogenation to the extent of at least 50% of the theoretical maximum;
   (b) subjecting to hydrogenation, a mixture of quinones wherein at least 50% is 2-ethyltetrahydroanthraquinone;
   (c) conducting the hydrogenation and oxidation in a solvent mixture wherein between 40% and 80% v./v. consists of at least one cycloalkanol ester; and
   (d) the hydrogenation temperature is in the range of from 50° C. to 150° C., whereby the production capacity of hydrogen peroxide is at least 6.5 g./l.

References Cited

UNITED STATES PATENTS

| 2,860,036 | 11/1958 | Lait | 23—207 |
| 2,927,002 | 3/1960 | LeFeuvre | 23—207 |

FOREIGN PATENTS 561,674  8/1958  Canada.

OSCAR R. VERTIZ, Primary Examiner

H. S. MILLER, Assistant Examiner

U.S. Cl. X.R.

260—369